US011880979B2

(12) United States Patent
Park et al.

(10) Patent No.: US 11,880,979 B2
(45) Date of Patent: *Jan. 23, 2024

(54) METHOD AND APPARATUS WITH VIDEO SEGMENTATION

(71) Applicant: Samsung Electronics Co., Ltd., Suwon-si (KR)

(72) Inventors: Seungin Park, Yongin-si (KR); Seokhwan Jang, Anyang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/707,023

(22) Filed: Mar. 29, 2022

(65) Prior Publication Data

US 2022/0222828 A1 Jul. 14, 2022

Related U.S. Application Data

(63) Continuation of application No. 16/900,649, filed on Jun. 12, 2020, now Pat. No. 11,321,848.

(30) Foreign Application Priority Data

Nov. 19, 2019 (KR) .................. 10-2019-0148849

(51) Int. Cl.
*G06T 7/11* (2017.01)
*G06T 7/168* (2017.01)
(Continued)

(52) U.S. Cl.
CPC .................. *G06T 7/11* (2017.01); *G06N 3/04* (2013.01); *G06T 7/149* (2017.01); *G06T 7/168* (2017.01);
(Continued)

(58) Field of Classification Search
CPC . G06T 7/11; G06T 7/149; G06T 7/168; G06T 7/174; G06T 2207/10016;
(Continued)

(56) References Cited

U.S. PATENT DOCUMENTS 8,150,155 B2 4/2012 El-Maleh et al.
8,682,063 B2 3/2014 Wang et al.
(Continued)

FOREIGN PATENT DOCUMENTS

CN 107704862 A 2/2018
CN 110163875 A 8/2019

OTHER PUBLICATIONS

Tokmakov, Pavel et al., "Learning Motion Patterns in Videos", *The IEEE Conference on Computer Vision and Pattern Recognition (CVPR)*, 2017 (pp. 3386-3394).
(Continued)

*Primary Examiner* — Chan S Park
*Assistant Examiner* — Daniel C Chang
(74) *Attorney, Agent, or Firm* — NSIP Law

(57) ABSTRACT

A method with video segmentation may include: acquiring, over time, a video sequence including a plurality of image frames, the plurality of image frames including a second image frame corresponding to a time t of the video sequence and a first image frame corresponding to a time t−1 before the time t; extracting a second feature vector from the second image frame; generating second hidden state information corresponding to the second image frame, based on first hidden state information corresponding to the first image frame and second fusion information in which the second feature vector is fused with information related to the second image frame stored in a memory; generating a second segmentation mask corresponding to the second image frame, based on an output vector corresponding to the
(Continued)

second hidden state information; and outputting the second segmentation mask.

12 Claims, 7 Drawing Sheets

(51) Int. Cl.
*G06T 7/174* (2017.01)
*G06N 3/04* (2023.01)
*G06T 7/149* (2017.01)
*G06V 10/82* (2022.01)
*G06V 20/40* (2022.01)

(52) U.S. Cl.
CPC .............. *G06T 7/174* (2017.01); *G06V 10/82* (2022.01); *G06V 20/46* (2022.01); *G06T 2207/10016* (2013.01); *G06T 2207/20084* (2013.01)

(58) Field of Classification Search
CPC . G06T 2207/20084; G06T 7/194; G06T 7/10; G06N 3/04; G06N 3/045; G06N 3/044; G06V 10/82; G06V 20/46; G06F 18/253; H04N 21/8456
See application file for complete search history.

(56) References Cited

U.S. PATENT DOCUMENTS

| | | |
|---|---|---|
| 2012/0294530 A1 | 11/2012 | Bhaskaranand et al. |
| 2017/0213112 A1 | 7/2017 | Sachs et al. |
| 2019/0138816 A1 | 5/2019 | Li et al. |
| 2020/0034971 A1* | 1/2020 | Xu .......................... G06T 7/246 |
| 2021/0090289 A1* | 3/2021 | Karanam .................. G06T 7/74 |
| 2021/0150728 A1 | 5/2021 | Ahmed et al. |
| 2021/0383171 A1* | 12/2021 | Lee ........................ G06N 3/045 |

OTHER PUBLICATIONS

Tokmakov, Pavel et al., "Learning Video Object Segmentation with Visual Memory", *Proceedings of the IEEE International Conference on Computer Vision*, 2017 (pp. 4481-4490).

Xu, Ning et al., "YouTube—VOS: Sequence-to-Sequence Video Object Segmentation", *Proceedings of the European Conference on Computer Vision (ECCV)*, 2018 (pp. 585-601).

Song, Hongmei et al., "Pyramid Dilated Deeper ConvLSTM for Video Salient Object Detection", *Springer*, 2018 (pp. pp. 744-760).

Ventura, Carles et al., "RVOS: End-to-End Recurrent Network for Video Object Segmentation", *Proceedings of the IEEE Conference on Computer Vision and Pattern Recognition*, 2019 (pp. 5277-5286).

Park, Jong-Chan, "Video Object Segmentation using Space-Time Memory Networks", *Lunit Tech Blog*, 2019 (4 pages in English, 20 pages in korean).

* cited by examiner

METHOD AND APPARATUS WITH VIDEO SEGMENTATION

CROSS-REFERENCE TO RELATED APPLICATIONS

This application is a continuation of U.S. patent application Ser. No. 16/900,649 filed on Jun. 12, 2020 which claims the benefit under 35 U.S.C. § 119(a) of Korean Patent Application No. 10-2019-0148849, filed on Nov. 19, 2019 in the Korean Intellectual Property Office, the entire disclosures of which are incorporated herein by reference for all purposes.

BACKGROUND

1. Field

The following description relates to a video segmentation method and apparatus.

2. Description of Related Art

In many cases in which video object segmentation (VOS) is performed with respect to consecutive video images, the video images may include images longer than the length of a sequence that can be processed by a neural network-based model. Further, if the length of input images increases when segmentation is performed consecutively with respect to images of an environment around a user in the field of augmented reality (AR), the neural network-based model may have a limited processing performance. In addition, if a target object to be segmented continuously moves, deforms, or is occluded by movements of other objects, the neural network-based model may have difficulty in precise processing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with video segmentation includes: acquiring, over time, a video sequence including a plurality of image frames, the plurality of image frames including a second image frame corresponding to a time t of the video sequence and a first image frame corresponding to a time t−1 before the time t; extracting a second feature vector from the second image frame; generating second hidden state information corresponding to the second image frame, based on first hidden state information corresponding to the first image frame and second fusion information in which the second feature vector is fused with information related to the second image frame stored in a memory; generating a second segmentation mask corresponding to the second image frame, based on an output vector corresponding to the second hidden state information; and outputting the second segmentation mask.

The generating of the second hidden state information may include: reading the information related to the second image frame from the memory, based on a relation between the second feature vector and a first feature vector stored in the memory and corresponding to at least one object included in the second image.

The reading of the information related to the second image frame from the memory may include: determining the relation between the second feature vector and the first feature vector using an attention mechanism; and reading the information related to the second image frame from the memory in response to the relation between the second feature vector and the first feature vector being higher than a preset standard.

The generating of the second hidden state information may include: generating the second fusion information by fusing the second feature vector with the information related to the second image frame; and generating the second hidden state information corresponding to the second image frame, based on the second fusion information and the first hidden state information.

The method may further include: storing the second hidden state information in the memory, based on a dissimilarity between hidden state information stored in the memory and the second feature vector.

The storing of the second hidden state information in the memory may include: determining the dissimilarity between the hidden state information stored in the memory and the second feature vector; and storing the second hidden state information in the memory, based on a result of comparing the dissimilarity to a preset reference value.

The determining of the dissimilarity may include either one of: determining the dissimilarity based on a similarity distance between the hidden state information stored in the memory and the second feature vector; and determining the dissimilarity based on an entropy-based correlation between the hidden state information stored in the memory and the second feature vector.

The method may further include: storing the second segmentation mask in the memory.

The method may further include, in response to reception of a third image frame, among the plurality of image frames, corresponding to a time t+1 after the time t: combining the third image frame with the second segmentation mask; extracting a third feature vector from an image in which the third image frame and the second segmentation mask are combined; generating third hidden state information corresponding to the third image frame, based on the second hidden state information and third fusion information in which the third feature vector is fused with information related to the third image frame stored in the memory; generating a third segmentation mask corresponding to the third image frame, based on an output vector corresponding to the third hidden state information; and outputting the third segmentation mask.

In another general aspect, a non-transitory computer-readable storage medium stores instructions that, when executed by a processor, cause the processor to perform the method described above.

In another general aspect, an apparatus with video segmentation includes: a communication interface configured to acquire, over time, a video sequence including a plurality of image frames, the plurality of image frames including a second image frame corresponding to a time t of the video sequence and a first image frame corresponding to a time t−1 before the time t; and a processor. The processor is configured to: extract a second feature vector from the second image frame; generate second hidden state information corresponding to the second image frame, based on first hidden state information corresponding to the first image frame and second fusion information in which the second feature vector is fused with information related to the second image frame stored in a memory; generate a second segmentation mask corresponding to the second image frame, based on an output vector corresponding to the second hidden state information; and output the second segmentation mask.

The memory may be configured to store a first feature vector corresponding to at least one object included in the second image frame. The processor may be further configured to read the information related to the second image frame from the memory based on a relation between the second feature vector and the first feature vector.

The processor may be further configured to determine the relation between the second feature vector and the first feature vector using an attention mechanism, and read the information related to the second image frame from the memory in response to the relation between the second feature vector and the first feature vector being higher than a preset standard.

The processor may be further configured to generate the second fusion information by fusing the second feature vector with the information related to the second image frame, and generate the second hidden state information corresponding to the second image frame, based on the second fusion information and the first hidden state information.

The processor may be further configured to store the second hidden state information in the memory based on a dissimilarity between hidden state information stored in the memory and the second feature vector.

The processor may be further configured to determine the dissimilarity between the hidden state information stored in the memory and the second feature vector, and store the second hidden state information in the memory based on a result of comparing the dissimilarity to a preset reference value.

The processor may be further configured to: determine the dissimilarity based on a similarity distance between the hidden state information stored in the memory and the second feature vector, or determine the dissimilarity based on an entropy-based correlation between the hidden state information stored in the memory and the second feature vector.

The processor may be further configured to store the second segmentation mask in the memory.

The processor may be further configured to, in response to the communication interface receiving a third image frame, among the plurality of image frames, corresponding to a time t+1 after the time t: combine the third image frame with the second segmentation mask; extract a third feature vector from an image in which the third image frame and the second segmentation mask are combined; generate third hidden state information corresponding to the third image frame based on the second hidden state information corresponding to the second image frame and third fusion information in which the third feature vector is fused with information related to the third image frame stored in the memory; generate a third segmentation mask corresponding to the third image frame, based on an output vector corresponding to the third hidden state information; and output the third segmentation mask.

In another general aspect, an apparatus with video segmentation includes: a communication interface configured to acquire, over time, a video sequence including a plurality of image frames, the plurality of image frames including a second image frame corresponding to a time t of the video sequence and a first image frame corresponding to a time t−1 before the time t; an encoder configured to extract a second feature vector from the second image frame; a memory configured to store information related to the second image frame; a recurrent neural network (RNN) configured to generate second hidden state information corresponding to the second image frame, based on first hidden state information corresponding to the first image frame and second fusion information in which the second feature vector is fused with the stored information related to the second image frame; and a decoder configured to generate a second segmentation mask corresponding to the second image frame, based on an output vector corresponding to the second hidden state information, and output the second segmentation mask.

The encoder may include a convolutional neural network (CNN)-based ResNet or VGG network.

The memory may be further configured to store a first feature vector corresponding to at least one object included in the second image frame. The RNN may be further configured to read the stored information related to the second image frame from the memory, in response to determining that a relation between the second feature vector and the first feature vector is higher than a preset standard.

In another general aspect, an apparatus with video segmentation includes one or more processors configured to: extract a second feature vector from a second image frame, among a plurality of image frames acquired from a video sequence, wherein the second image frame corresponds to a selected time in the time sequence; generate second fusion information by fusing the second feature vector with information related to the second image frame stored in a memory; generate second hidden state information corresponding to the second image frame, based on first hidden state information and the second fusion information, wherein the first hidden state information corresponds to a first image frame, among the plurality of image frames, corresponding to a time before the selected time in the time sequence; generate a second segmentation mask corresponding to the second image frame, based on the second hidden state information; and output the second segmentation mask.

The one or more processors may be further configured to read the information related to the second image frame from the memory, in response to determining that the second feature vector is similar to or overlaps with a first feature vector that is stored in the memory and corresponds to at least one object included in the second image frame.

The one or more processors may be further configured to: compare a dissimilarity between hidden state information stored in the memory and the second feature vector to a preset reference value; and store the second hidden state information in the memory, in response to a result of the comparing being that the dissimilarity is greater than the preset reference value.

Other features and aspects will be apparent from the following detailed description, the drawings, and the claims.

Figure 1:
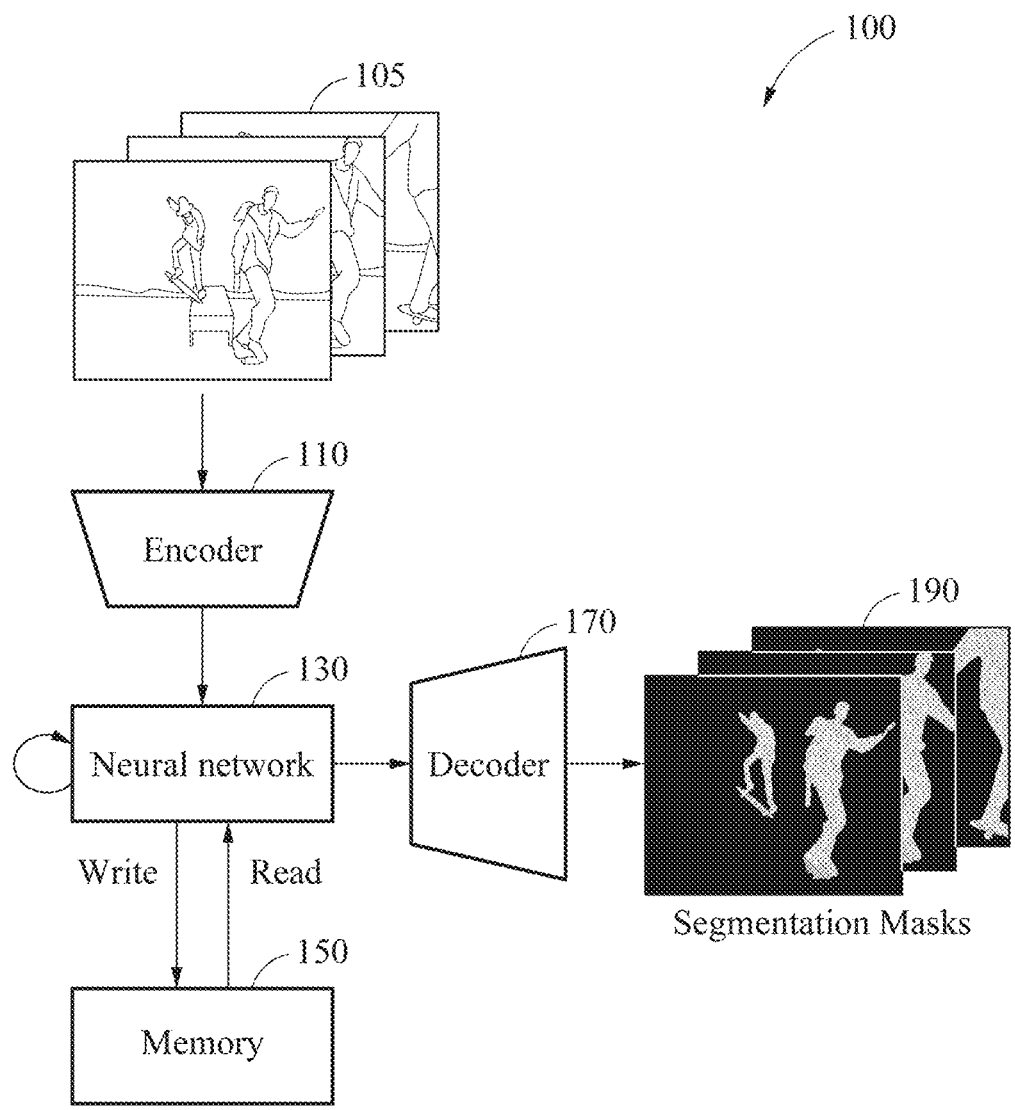
FIG. 1 illustrates an example of a structure of a video segmentation apparatus.

Throughout the drawings and the detailed description, the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms including technical and scientific terms used herein have the same meaning as commonly understood by one of ordinary skill in the art to which this disclosure pertains, consistent with and after an understanding of this disclosure. It will be further understood that terms, such as those defined in commonly-used dictionaries, should be interpreted as having a meaning that is consistent with their meaning in the context of the relevant art and this disclosure, and are not to be interpreted in an idealized or overly formal sense unless expressly so defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates an example of a structure of a video segmentation apparatus. Referring to FIG. 1, a video segmentation apparatus 100 (hereinafter, the "segmentation apparatus") includes, for example, an encoder 110, a neural network 130, a memory 150, and a decoder 170. For example, the encoder 110, the neural network 130, and the decoder 170 may correspond to elements of a processor 730 which will be described below with reference to FIG. 7.

Figure 7:
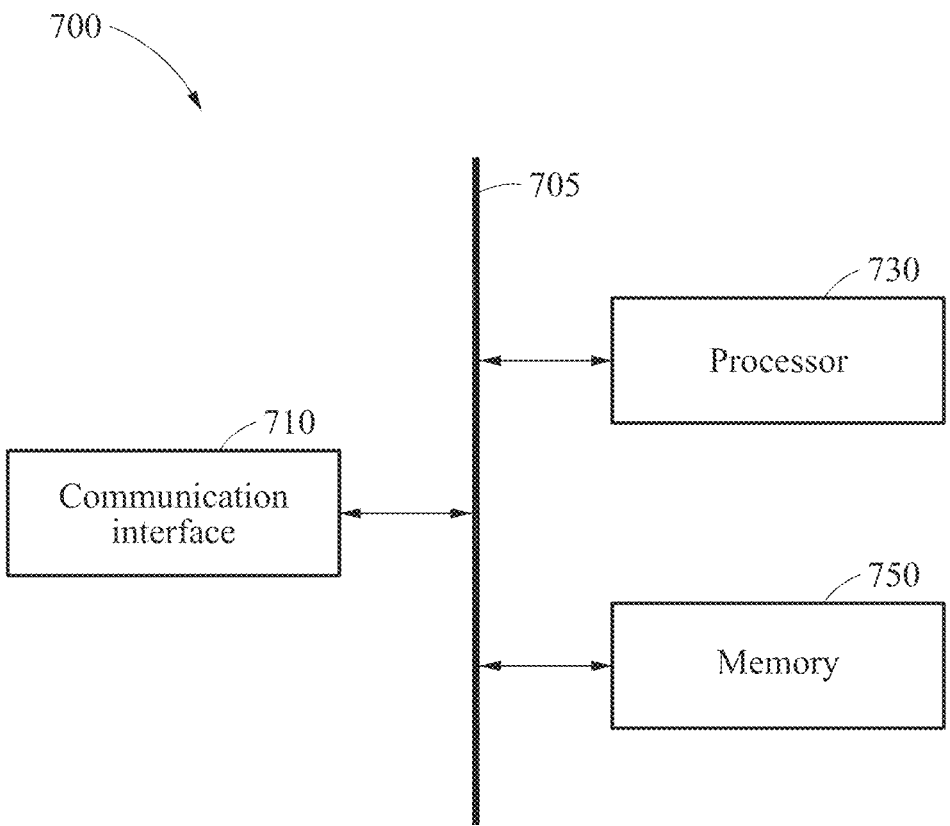
FIG. 7 illustrates an example of a video segmentation apparatus.

The segmentation apparatus 100 may acquire a video sequence 105 including a plurality of image frames over time, for example, through a communication interface (for example, a communication interface 710 of FIG. 7).

The encoder 110 may extract a feature vector from each image frame of the video sequence 105. For example, the encoder 110 extracts a feature vector $X_t$ from an image frame of a current time (for example, a time t) of the video sequence 105. Here, the "time" corresponds to a time step. For example, the encoder 110 is a convolutional neural network (CNN)-based ResNet or VGG network. However, the encoder 110 may be another type of neural network.

The encoder 110 may extract a multi-scale feature or a motion feature from two consecutive images to utilize a motion cue, and may embed the extracted feature in a feature of the image, whereby the segmentation apparatus 100 may process objects of various sizes.

The neural network 130 has a feedback structure in which a previous output is applied as a current input again. The neural network 130 is, for example, a deep neural network with the feedback structure as a backbone architecture. The neural network 130 may be a neural network with a recurrent structure, for example, a convolutional long-short term memory (ConvLSTM), a convolutional GRU (ConvGRU), or a recurrent neural network (RNN).

For example, the neural network 130 generates hidden state information corresponding to each image frame by processing the image frame of the video sequence 105. The "hidden state" corresponds to a respective activation or an inner state of nodes (artificial neurons) of one or more layers constituting the neural network 130, and the "hidden state information" corresponds to information indicating the activations or the inner state of the nodes of respective layers of the neural network 130. Such reference to "artificial neurons" is not intended to impart any relatedness with respect to how the neural network architecture computationally maps or thereby intuitively recognizes information, and how a human's neurons operate. In other words, the term "neuron" is merely a term of art referring to the hardware implemented nodes of a neural network, and will have a same meaning as a node of the neural network.

For example, a hidden state of the nodes of the neural network 130 may be the resultant feature map or feature vector of the layer, and may include temporal information in which items of information processed at previous times may be accumulated by the feedback structure of the neural network 130 to provide, for example, that resultant feature map or feature vector as another input to a previous layer of the neural network 130. As noted, the hidden state information is, for example, information in the form of a vector, such as a hidden state vector. Further, the hidden state information may represent or provide, for example, a feature vector corresponding to at least one object included in an image frame.

The segmentation apparatus 100 determines historical information indicating forms or states of a target object and/or the other objects included in the video sequence 105 in previous frames, through hidden state information stored in the memory 150. Even when the target object moves, deforms, or is occluded by movements of other objects in the video sequence 105, the segmentation apparatus 100 may more easily segment the target object and/or the other objects included in the video sequence 105 based on the hidden state information corresponding to previous frames stored in the memory 150.

Hereinafter, for ease of description, a current time will be referred to as a "time t", a past time, that is, a previous time before the current time, will be referred to as a "time t−1", and a future time after the current time will be referred to as a "time t+1".

The neural network 130 may generate fusion information $X'_t$ by fusing the feature vector $X_t$ extracted from the image frame of the time t with information related to the image frame of the time t stored in the memory 150. For example, the information related to the image frame of the time t corresponds to information determined to have a predetermined relation with the image frame of the time t and thus read by the neural network 130, among hidden state information accumulated in the memory 150 with respect to image frames of before the time t, that is, up to the time t−1.

The neural network 130 may generate hidden state information $H_t$ corresponding to the image frame of the time t based on the fusion information $X'_t$ and first hidden state information $H_{t-1}$ corresponding to an image frame of a previous time.

The neural network 130 may utilize, for example, a ConvLSTM structure to preserve spatial information of feature vectors of two-dimensional (2D) image frames acquired through a convolution operation of the encoder 110. In another example, the segmentation apparatus 100 may utilize an RNN, LSTM, or GRU structure by transforming 2D image frames to one-dimensional feature vectors.

The memory 150 stores the information related to the image frame of the time t. Additionally, the memory 150 stores long-term hidden state information corresponding to multiple past times based on the time t.

The segmentation apparatus 100 may select information determined to be significant from the hidden state information of the current time and write the selected information in the memory 150. For example, the "information determined to be significant" may correspond to information not overlapping information of the image frame of the previous time, or information with a relatively high dissimilarity to the information of the image frame of the previous time.

For example, consecutive frames included in the video sequence 105 may include very similar or repeated information. Thus, the segmentation apparatus 100 may not store information of all image frames, but rather may store hidden state information corresponding to the image frame of the current time in the memory 150 if a feature vector extracted from the image frame does not overlap hidden state information corresponding to image frames of previous times stored in the memory 150.

In an example, the segmentation apparatus 100 stores hidden state information of each time in the memory 150 at predetermined time intervals.

Further, the segmentation apparatus 100 segments the target object and/or the other objects included in the video sequence 105 by utilizing long-term memory by reading the hidden state information of the previous times stored in the memory 150, at a necessary time.

When processing the image frame of the time t thereafter, the segmentation apparatus 100 may not read all information stored in the memory 150, but rather may read information having a relation to the object observed in the image frame of the time t and utilize the read information for segmentation.

The decoder 170 may generate segmentation masks 190 corresponding to the image frame of the time t based on an output vector corresponding to the hidden state information generated by the neural network 130, and output the segmentation masks 190.

Although FIG. 1 shows the segmentation apparatus 100 which the neural network 130 and the decoder 170 are separated, the neural network 130 and the decoder 170 may be configured as a single element, such as a neural network-based decoder. An operation of the segmentation apparatus 100 configured as the neural network-based decoder will be described below with reference to FIG. 2.

Figure 2:
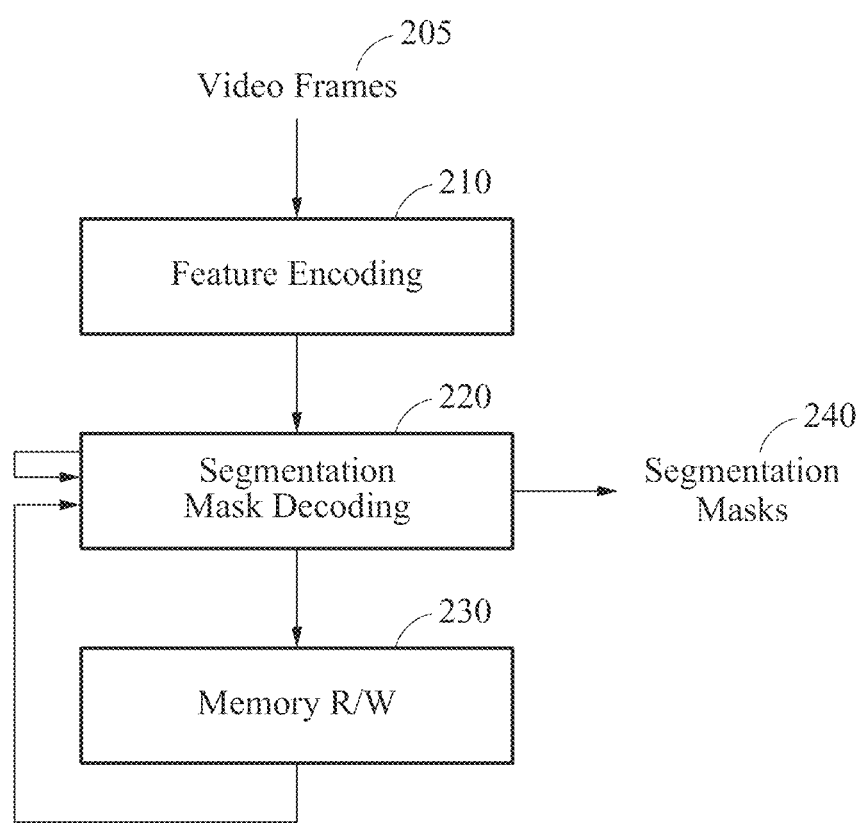
FIG. 2 illustrates an example of a video segmentation method.

FIG. 2 illustrates an example of a video segmentation method. Referring to FIG. 2, in an example in which video frames 205 are provided as an input image, a segmentation apparatus extracts features of the video frames 205 through encoding, in operation 210. The features of the video frames 205 are in the form of feature vectors.

In operation 220, the segmentation apparatus transmits the features obtained in operation 210 to a neural network-based decoder for generating a segmentation mask. The neural network-based decoder may be, for example, a convLSTM-based decoder.

The segmentation apparatus determines whether an image frame of a current time being currently processed is an image frame having a significant difference by comparing the image frame of the current time to information corresponding to image frames of previous times. In this example, the "image frame having a significant difference" may be an image frame including a relatively large quantity of information to be additionally obtained when compared to information of the previous times. The image frame having a significant difference is, for example, a first image frame among the video frames 205, or an image frame with relatively high dissimilarity to information of a previous time stored in a memory.

In operation 230, in response to an image frame A being currently processed being determined to be an image frame having a significant difference, the segmentation apparatus stores hidden state information corresponding to the image frame A, generated by the neural network-based decoder, in the memory.

The segmentation apparatus may determine a dissimilarity by comparing a feature distribution, a correlation, or a distance between a feature vector corresponding to the image frame being currently processed and information of the previous time stored in the memory (for example, hidden state information corresponding to image frames of previous times).

For example, if information useful for processing of the image frame is already stored in the memory, the neural network-based decoder may receive the features obtained in operation 210 and the information stored in the memory and estimate segmentation masks 240 corresponding to the video frames 205.

Figure 3:
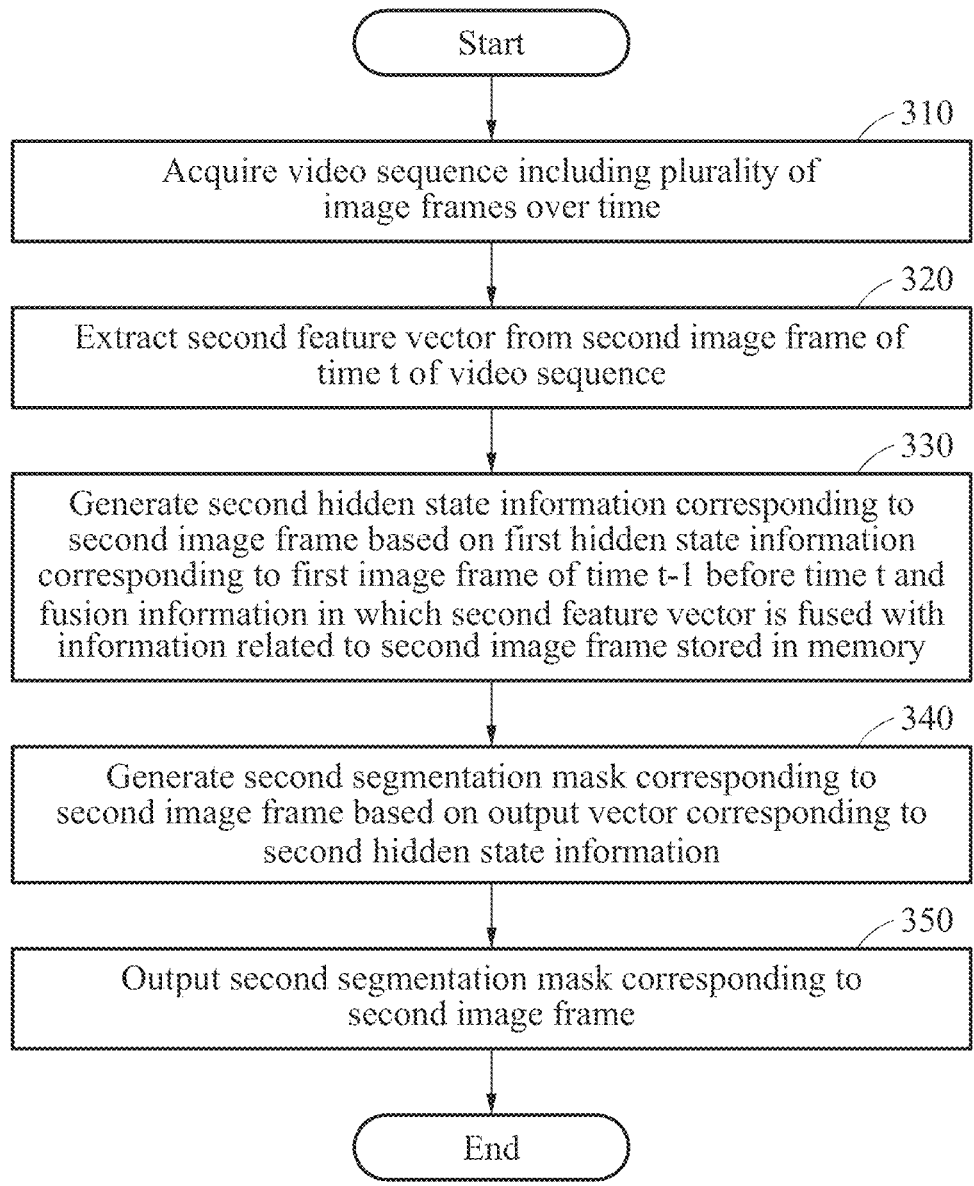
FIG. 3 illustrates an example of a video segmentation method.

FIG. 3 illustrates an example of a video segmentation method. In the following description of FIG. 3, for ease of description, an image frame of a previous time will be referred to as the "first image frame", an image frame of a current time will be referred to as the "second image frame", and an image frame of a time after the current time will be referred to as the "third image frame". Further, a feature vector extracted from the first image frame will be referred to as the "first feature vector", a feature vector extracted from the second image frame will be referred to as the "second feature vector", and a feature vector extracted from the third image frame will be referred to as the "third feature vector."

Referring to FIG. 3, in operation 310, a segmentation apparatus acquires a video sequence including a plurality of image frames over time.

In operation 320, the segmentation apparatus extracts a second feature vector from a second image frame of a time t of the video sequence.

In operation 330, the segmentation apparatus generates second hidden state information corresponding to the second image frame based on first hidden state information corresponding to a first image frame of a time t−1 before the time t and fusion information. In this example, the "fusion information" correspond to second fusion information in which the second feature vector is fused with information related to the second image frame stored in a memory.

In detail, the segmentation apparatus generates the fusion information (the second fusion information) by reading the information related to the second image frame from the memory, based on a relation between the second feature vector and a first feature vector that is stored in memory and corresponds to at least one object included in the second image frame. The segmentation apparatus generates the second hidden state information corresponding to the second image frame based on the fusion information (the second fusion information) and the first hidden state information. An example of generating the second hidden state information by the segmentation apparatus will be described in more detail below with reference to FIG. 4.

In operation 340, the segmentation apparatus generates a second segmentation mask corresponding to the second image frame based on an output vector corresponding to the second hidden state information. The segmentation apparatus stores the second segmentation mask in the memory.

In operation 350, the segmentation apparatus outputs the second segmentation mask corresponding to the second image frame.

Figure 4:
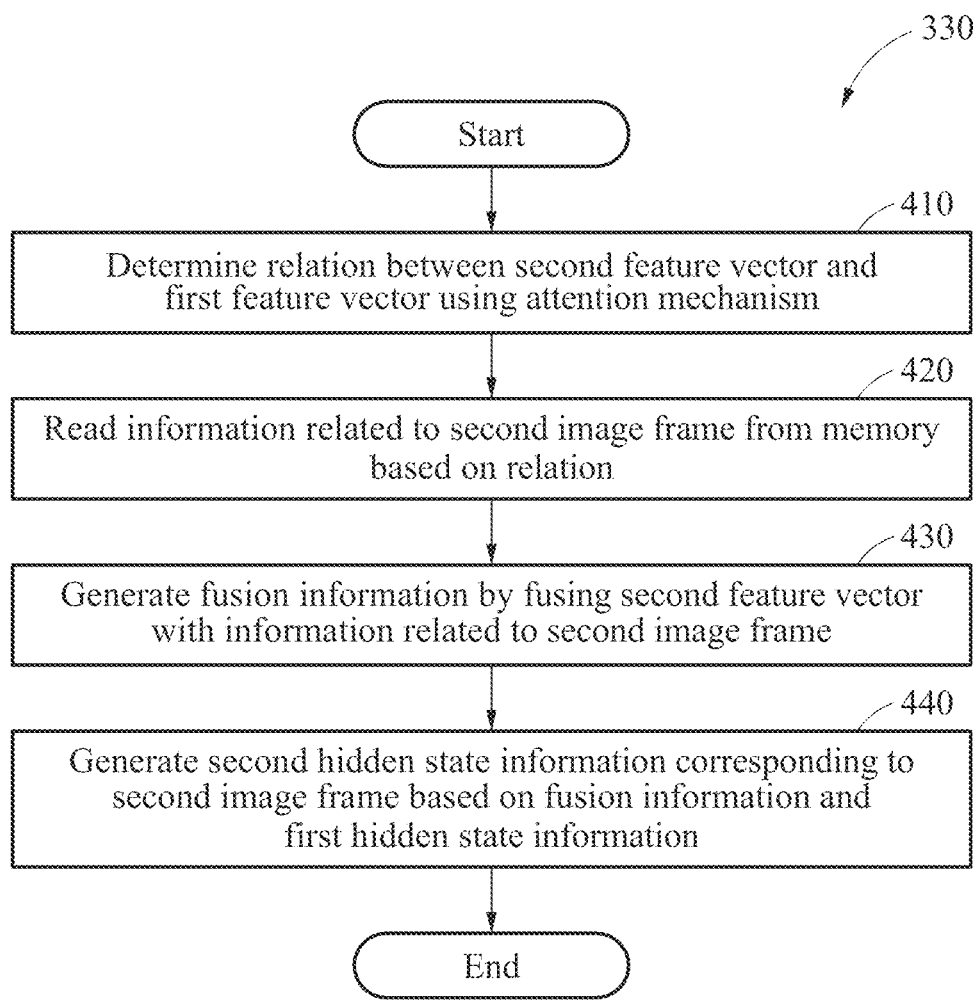
FIG. 4 illustrates an example of generating second hidden state information.

FIG. 4 illustrates an example of generating second hidden state information. Referring to FIG. 4, in operation 410, a segmentation apparatus determines a relation between a second feature vector and a first feature vector using an attention mechanism. The "attention mechanism" is, for example, a scheme of paying attention to object(s) having the same shape or object(s) of the same class included in an image frame, based on the visual attention of humans. For example, the attention mechanism may be implemented in the form of spatio-temporal attention that extends soft attention based on a non-local block to a temporal axis. The segmentation apparatus may determine the relation regarding whether the second feature vector and the first feature vector are similar or overlap, using the attention mechanism.

In operation 420, the segmentation apparatus reads information related to a second image frame from a memory based on the determined relation. The information related to the second image frame is, for example, a hidden state vector or hidden state information having a predetermined relation with the second image frame.

In operation 430, the segmentation apparatus generates fusion information (for example, second fusion information) by fusing the second feature vector with the information related to the second image frame. In this example, the information related to the second image frame is a hidden state vector. Thus, the segmentation apparatus may generate the fusion information through a vector operation.

In operation 440, the segmentation apparatus generates second hidden state information corresponding to the second image frame based on the fusion information (for example, second fusion information) and the first hidden state information.

Figure 5:
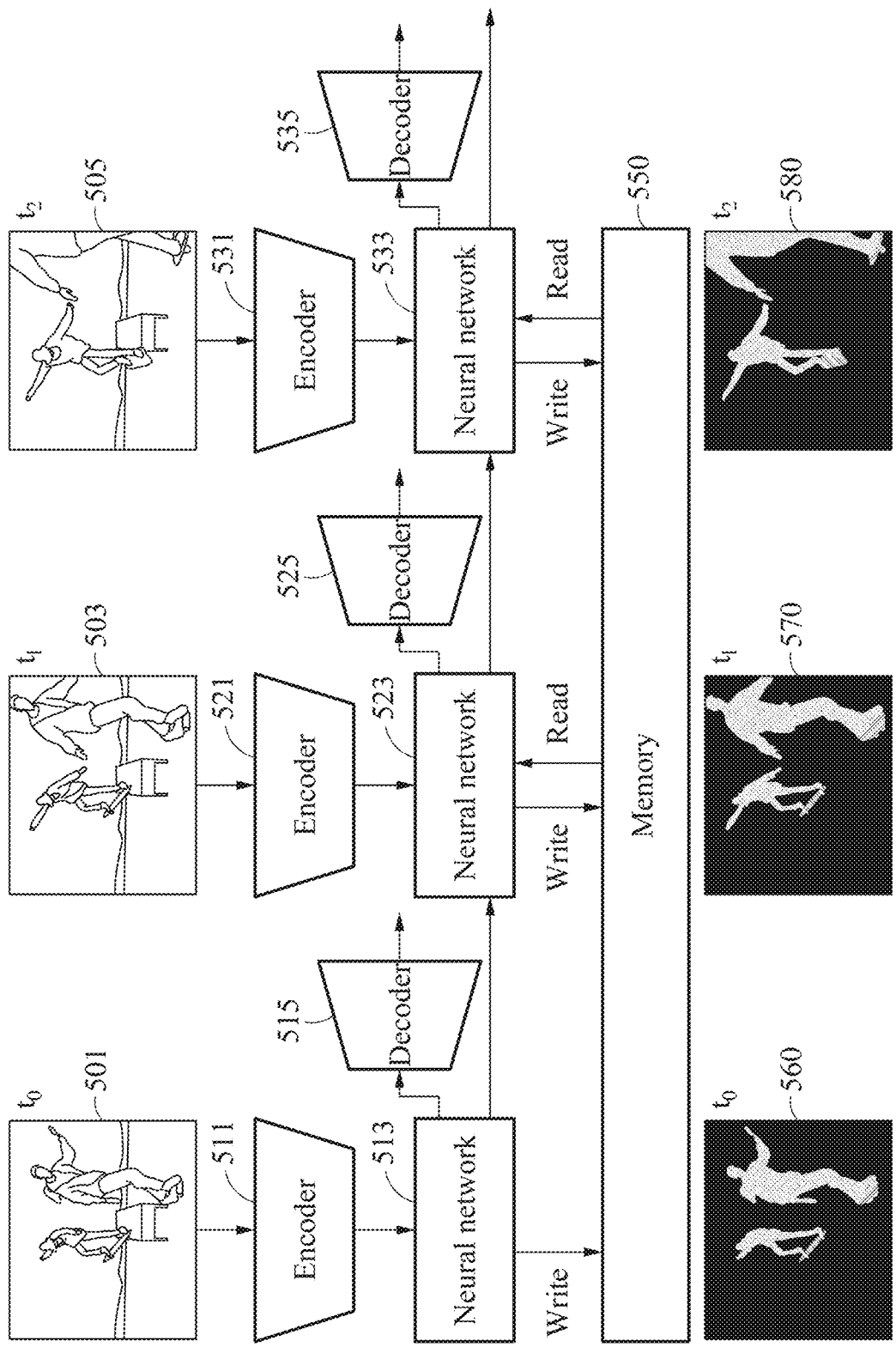
FIG. 5 illustrates an example of processing consecutive image frames in a video segmentation apparatus.

FIG. 5 illustrates an example of processing consecutive image frames in a video segmentation apparatus. Referring to FIG. 5, consecutive image frames 501, 503, and 505 of a video sequence and segmentation masks 560, 570, and 580, output from a video segmentation apparatus, corresponding to the consecutive image frames 501, 503, and 505 are illustrated. The segmentation mask 560 is a mask for segmenting a target object corresponding to the image frame 501 of a time $t_0$, the segmentation mask 570 is a mask for segmenting a target object corresponding to the image frame 503 of a time $t_1$, and the segmentation mask 580 is a mask for segmenting a target object corresponding to the image frame 505 of a time $t_2$.

Further, in FIG. 5, encoders 511, 521, and 531, neural networks 513, 523, and 533, and decoders 515, 525, and 535 are illustrated as separate elements to describe a process of consecutively processing image frames over time. In practice, the encoders 511, 521, and 531, the neural networks 513, 523, and 533, and the decoders 515, 525, and 535 may respectively correspond to a single encoder, a single neural network, and a single decoder included in the video segmentation apparatus.

For example, among the consecutive image frames 501, 503, and 505 of the video sequence, the image frame 501 which is a first image is input at the time $t_0$.

In this example, the encoder 511 of the video segmentation apparatus extracts a first feature vector from the image frame 501. For example, the neural network 513 generates first hidden state information corresponding to the image frame 501 based on the first feature vector. In this example, since the image frame 501 is the first image frame of the video sequence, there is no information stored in a memory 550. Accordingly, in this example, the neural network 513 does not generate separate fusion information since there is no information to be read from the memory 550 to fuse with the first feature vector. The neural network 513 therefore generates the first hidden state information based on the first feature vector.

Further, since there is no information stored in the memory 550, a dissimilarity to the first hidden state information has a value greater than a preset reference value. Thus, the neural network 513 writes or stores all first hidden state information corresponding to the image frame 501 in the memory 550.

The decoder 515 generates and outputs the first segmentation mask 560 corresponding to the image frame 501 based on an output vector corresponding to the first hidden state information generated by the neural network 513. In this example, the first hidden state information corresponding to the image frame 501 is fed back and transmitted to the neural network 523.

Thereafter, the image frame 503 is input at the time $t_1$. The encoder 521 extracts a second feature vector from the image frame 503. The neural network 523 reads information related to the image frame 503 from the memory 550 based on a relation between the second feature vector and the first feature vector corresponding to at least one object included in the image frame 501 stored in the memory 550. For example, the neural network 523 may determine the relation between the second feature vector and the first feature vector corresponding to the at least one object included in the image frame 501 using the attention mechanism described above. In response to the relation being higher than a preset standard, the neural network 523 reads the information related to the image frame 503 from the memory 550.

The neural network 523 generates second fusion information by fusing the second feature vector with the information read from the memory 550. The segmentation apparatus generates second hidden state information corresponding to the image frame 503 based on the second fusion information and the first hidden state information.

The neural network 523 determines a dissimilarity between the second feature vector corresponding to the image frame 503 being currently processed and the information (for example, the first hidden state information) corresponding to the image frame 501 of the time $t_0$ stored in the memory 550. For example, the neural network 523 may determine the dissimilarity by comparing a feature distribution, an entropy-based correlation, or a similarity distance between the first hidden state information and the second feature vector.

In response to the determined dissimilarity being greater than or equal to a preset reference value, the neural network 523 stores (writes) the second hidden state information in the memory 550. In this example, the neural network 523 stores all the second hidden state information, or stores hidden state information corresponding to at least one object included in the image frame 503 in view of the relation with the second feature vector, among the second hidden state information.

The decoder 525 generates and outputs the second segmentation mask 570 corresponding to the image frame 503 based on an output vector corresponding to the second hidden state information generated by the neural network 523. In this example, the second hidden state information corresponding to the image frame 503 is fed back and transmitted to the neural network 533.

Thereafter, the image frame 505 is input at the time $t_2$. The encoder 531 extracts a third feature vector from the image frame 505. The neural network 533 reads information related to the image frame 505 from the memory 550 based on a relation between the third feature vector and the information (for example, the first feature vector corresponding to at least one object included in the image frame 501 and the second feature vector corresponding to at least one object included in the image frame 503) stored in the memory. The neural network 533 determines the relation between the third feature vector and the second feature vector corresponding to the at least one object included in the image frame 503 using the attention mechanism described above. In response to the relation being higher than a preset standard, the neural network 533 reads the information related to the image frame 505 from the memory 550.

The neural network 533 generates third fusion information by fusing the third feature vector with the information read from the memory 550. The segmentation apparatus generates third hidden state information corresponding to the image frame 505 based on the third fusion information and the second hidden state information.

The neural network 533 determines a dissimilarity between the third feature vector corresponding to the image frame 505 being currently processed and the information (for example, the first hidden state information) corresponding to the image frame 501 of the time $t_0$ and/or the information (for example, the second hidden state information) corresponding to the image frame 503 of the time $t_1$ stored in the memory 550. In response to the determined dissimilarity being greater than or equal to a preset reference value, the neural network 533 stores (writes) the third hidden state information in the memory 550. In this example, the neural network 533 stores all the third hidden state information, or stores hidden state information corresponding to at least one object included in the image frame 505 in view of the relation with the third feature vector, among the third hidden state information.

The decoder 535 generates and outputs the third segmentation mask 580 corresponding to the image frame 505 based on an output vector corresponding to the third hidden state information generated by the neural network 533.

Figure 6:
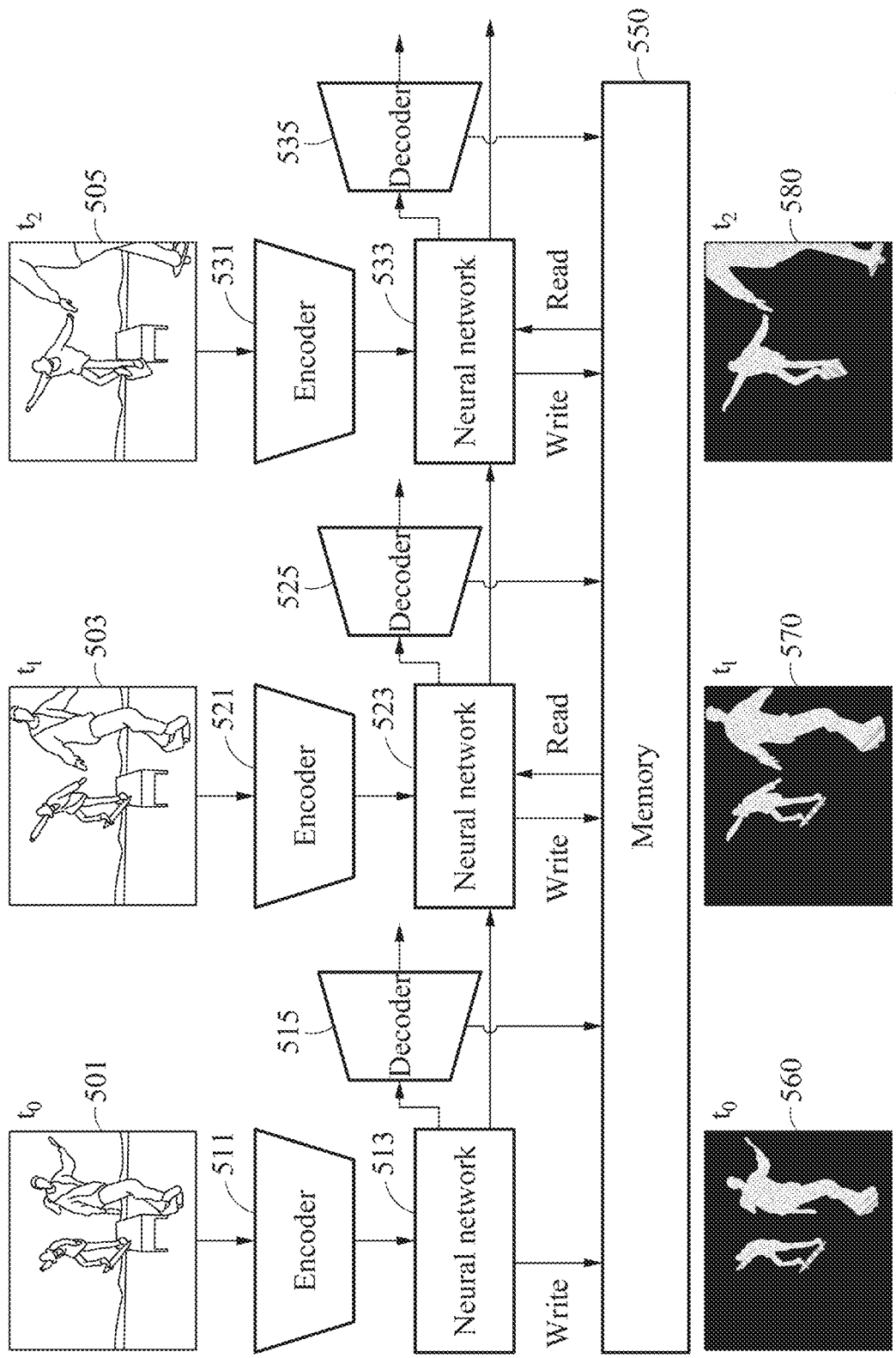
FIG. 6 illustrates an example of processing consecutive image frames using a segmentation mask of a previous time together.

FIG. 6 illustrates an example of processing consecutive image frames in a video segmentation apparatus. More specifically, in FIG. 6, a process of processing consecutive image frames by a video segmentation apparatus, based on information stored in a memory and a segmentation mask of a previous time, is illustrated.

The video segmentation apparatus additionally stores a segmentation mask generated corresponding to an image frame of each time in the memory 550, as shown in FIG. 6.

For example, if a target object included in image frames of a video sequence shows a continuous movement or a deformation, the video segmentation apparatus ensures a continuity with respect to segmentation mask estimation by utilizing segmentation information (for example, a segmentation mask corresponding to an image frame of a previous time) estimated corresponding to the image frame of the previous time.

For example, the image frame 505 of the time $t_2$ is input after the second segmentation mask 570 generated corresponding to the image frame 503 of the time $t_1$ is stored in the memory 550.

The encoder 531 generates a new input by concatenating the second segmentation mask 570 with the image frame 505 including RGB channels into fourth channel information, and extracts the third feature vector from the new input.

Thereafter, as described above, the neural network 533 reads the information related to the image frame 505 from the memory 550 based on the relation between the third feature vector and the information stored in the memory 550.

The neural network 533 generates third fusion information by fusing the third feature vector with the information read from the memory 550, and generates third hidden state information corresponding to the new input based on the third fusion information and the second hidden state information.

The neural network 533 determines a dissimilarity between the third feature vector corresponding to the new input and the information corresponding to the image frame 501 of the time $t_0$ and/or the information corresponding to the image frame 503 of the time $t_1$ stored in the memory 550. In response to the determined dissimilarity being greater than or equal to a preset reference value, the neural network 533 (ConvLSTM) stores (writes) the third hidden state information in the memory 550. In this example, the neural network 533 (ConvLSTM) stores all the third hidden state information, or stores hidden state information corresponding to at least one object included in the image frame 505 in view of the relation with the third feature vector, among the third hidden state information.

The decoder 535 generates and outputs the third segmentation mask 580 corresponding to the new image frame 505 based on an output vector corresponding to the third hidden state information generated by the neural network 533 (ConvLSTM).

FIG. 7 illustrates an example of a video segmentation apparatus. Referring to FIG. 7, a video segmentation apparatus 700 includes, for example, the communication interface 710, the processor 730, and a memory 750. The communication interface 710, the processor 730, and the memory 750 may communicate with each other through a communication bus 705.

The communication interface 710 may acquire a video sequence including a plurality of image frames over time.

The processor 730 may extract a second feature vector from a second image frame of a time t of the video sequence. The processor 730 may generate second hidden state information corresponding to the second image frame based on first hidden state information corresponding to a first image frame of a time t−1 before the time t and fusion information. The fusion information may correspond to information in which the second feature vector extracted from the second image frame fuses with information related to the second image frame stored in the memory 750. The processor 730 may generate a second segmentation mask corresponding to the second image frame based on an output vector corresponding to the second hidden state information. The processor 730 may output the second segmentation mask corresponding to the second image frame.

Further, the processor 730 may perform at least one of the methods described above with reference to FIGS. 1 through 6 or an algorithm corresponding to the at least one of the methods. The processor 730 is a data processing device implemented by hardware including a circuit having a physical structure to perform desired operations. For example, the desired operations may include instructions or codes included in a program. For example, the data processing device may include a microprocessor, a central processing unit (CPU), a processor core, a multi-core processor, a multiprocessor, an application-specific integrated circuit (ASIC), and a field-programmable gate array (FPGA).

The processor 730 may execute the program and control the video segmentation apparatus 700. Program codes to be executed by the processor 730 may be stored in the memory 750.

The memory 750 may store the information related to the second image frame, and a first feature vector corresponding to at least one object included in the second image frame. In addition, the memory 750 may store hidden state information corresponding to times before the time t.

Further, the memory 750 may store a variety of information generated during the processing process of the processor 730. In addition, the memory 750 may store a variety of data and programs. The memory 750 includes a volatile memory or a non-volatile memory. The memory 750 may include a high capacity storage medium such as a hard disk to store the variety of data.

The segmentation apparatuses 100 and 700, the encoders 110, 511, 521, and 531, the neural networks 130, 513, 523, and 533, the memories 150, 550, and 750, the decoders 170, 515, 525, and 535, the communication bus 705, the communication interface 710, the processor 730, the encoders, the neural networks, the memories, the decoders, the processors, and other apparatuses, units, modules, devices, and components described in FIGS. 1 to 7 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 to 7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method with video segmentation, comprising: acquiring, overtime, a video sequence comprising a plurality of image frames, the plurality of image frames including a second image frame corresponding to a time t of the video sequence and a first image frame corresponding to a time t−1 before the time t;

extracting a second feature vector from the second image frame;

generating second hidden state information corresponding to the second image frame, by using information related to the second image frame based on a relation between a first feature vector corresponding to at least one object included in the second image frame stored in a memory and the second feature vector, wherein the information related to the second image frame is determined to have a predetermined relation with the second image frame from among hidden state information of a plurality of the image frames corresponding to a time before the time t;

generating a second segmentation mask corresponding to the second image frame, based on an output vector corresponding to the second hidden state information;

determining a dissimilarity based on an entropy-based correlation between the hidden state information stored in the memory and the second feature vector;

storing the second hidden state information in the memory, based on a result of comparing the dissimilarity to a preset reference value; and outputting the second segmentation mask.

2. The method of claim 1, wherein the using of the information related to the second image frame comprises:

reading the information related to the second image frame from the memory in response to the relation between the second feature vector and the first feature vector being higher than a preset standard.

3. The method of claim 1, wherein the generating of the second hidden state information comprises:

generating second fusion information by fusing the second feature vector with the information related to the second image frame; and generating the second hidden state information corresponding to the second image frame, based on the second fusion information and first hidden state information corresponding to the first image frame.

4. The method of claim 1, further comprising:
storing the second segmentation mask in the memory.

5. The method of claim 4, further comprising, in response to reception of a third image frame, among the plurality of image frames, corresponding to a time t+1 after the time t:
combining the third image frame with the second segmentation mask;
extracting a third feature vector from an image in which the third image frame and the second segmentation mask are combined;
generating third hidden state information corresponding to the third image frame, based on the second hidden state information and third fusion information in which the third feature vector is fused with information related to the third image frame stored in the memory;
generating a third segmentation mask corresponding to the third image frame, based on an output vector corresponding to the third hidden state information; and
outputting the third segmentation mask.

6. A non-transitory computer-readable storage medium storing instructions that, when executed by a processor, cause the processor to perform the method of claim 1.

7. An apparatus with video segmentation, comprising:
a communication interface configured to acquire, over time, a video sequence comprising a plurality of image frames, the plurality of image frames including a second image frame corresponding to a time t of the video sequence and a first image frame corresponding to a time t−1 before the time t; and
a processor configured to:
extract a second feature vector from the second image frame;
generate second hidden state information corresponding to the second image frame, by using information related to the second image frame based on a relation between a first feature vector corresponding to at least one object included in the second image frame stored in a memory and the second feature vector, wherein the information related to the second image frame is determined to have a predetermined relation with the second image frame from among hidden state information of a plurality of the image frames corresponding to a time before the time t;
generate a second segmentation mask corresponding to the second image frame, based on an output vector corresponding to the second hidden state information;
determine a dissimilarity based on an entropy-based correlation between the hidden state information stored in the memory and the second feature vector;
store the second hidden state information in the memory, based on a result of comparing the dissimilarity to a preset reference value; and
output the second segmentation mask.

8. The apparatus of claim 7, wherein the processor is further configured to read the information related to the second image frame from the memory in response to the relation between the second feature vector and the first feature vector being higher than a preset standard.

9. The apparatus of claim 7, wherein the processor is further configured to generate second fusion information by fusing the second feature vector with the information related to the second image frame, and generate the second hidden state information corresponding to the second image frame, based on the second fusion information and first hidden state information corresponding to the first image frame.

10. The apparatus of claim 7, wherein the processor is further configured to store the second segmentation mask in the memory.

11. The apparatus of claim 10, wherein the processor is further configured to, in response to the communication interface receiving a third image frame, among the plurality of image frames, corresponding to a time t+1 after the time t:
combine the third image frame with the second segmentation mask;
extract a third feature vector from an image in which the third image frame and the second segmentation mask are combined;
generate third hidden state information corresponding to the third image frame based on the second hidden state information corresponding to the second image frame and third fusion information in which the third feature vector is fused with information related to the third image frame stored in the memory;
generate a third segmentation mask corresponding to the third image frame, based on an output vector corresponding to the third hidden state information; and
output the third segmentation mask.

12. An apparatus with video segmentation, comprising:
a communication interface configured to acquire, over time, a video sequence comprising a plurality of image frames, the plurality of image frames including a second image frame corresponding to a time t of the video sequence and a first image frame corresponding to a time t−1 before the time t;
an encoder configured to extract a second feature vector from the second image frame;
a memory configured to store information related to the second image frame;
a recurrent neural network (RNN) configured to generate second hidden state information corresponding to the second image frame, based on first hidden state information corresponding to the first image frame and second fusion information in which the second feature vector is fused with the stored information related to the second image frame; and
a decoder configured to generate a second segmentation mask corresponding to the second image frame, based on an output vector corresponding to the second hidden state information, and output the second segmentation mask,
wherein the memory is configured to store a first feature vector corresponding to at least one object included in the second image frame, wherein the processor is further configured to:
generate second hidden state information corresponding to the second image frame, by using information related to the second image frame based on a relation between the first feature vector and the second feature vector, and
wherein the information related to the second image frame is determined to have a predetermined relation with the second image frame from among hidden state information of a plurality of the image frames corresponding to a time before the time t,
wherein the processor is further configured to:
determine a dissimilarity based on an entropy-based correlation between hidden state information stored in the memory and the second feature vector; and store the second hidden state information in the memory, based on a result of comparing the dissimilarity to a preset reference value.

\* \* \* \* \*